May 29, 1962 D. A. HAY 3,036,824
HEAT TREATING DEVICES
Filed Sept. 3, 1957 2 Sheets-Sheet 1
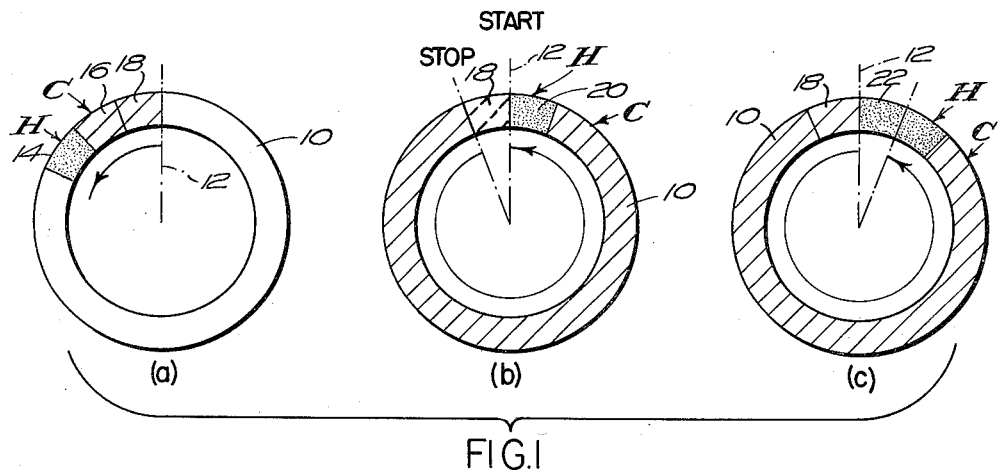
FIG.1
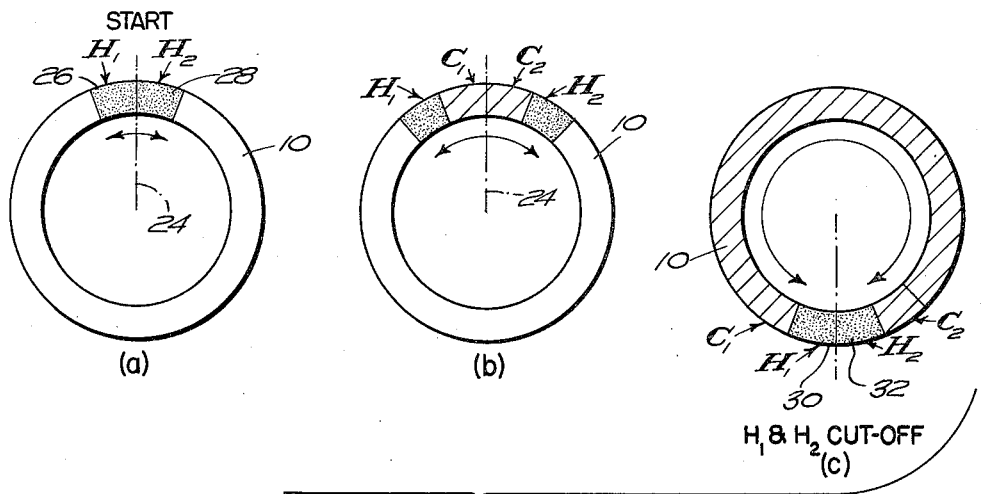
FIG. 2
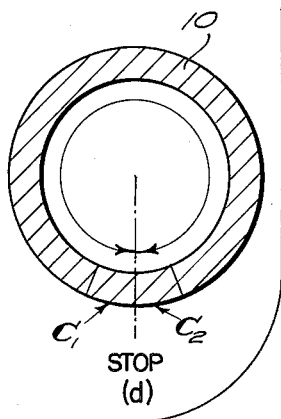
INVENTOR.
Donald A. Hay
BY
Morse & Altman May 29, 1962 D. A. HAY 3,036,824
HEAT TREATING DEVICES
Filed Sept. 3, 1957 2 Sheets-Sheet 2
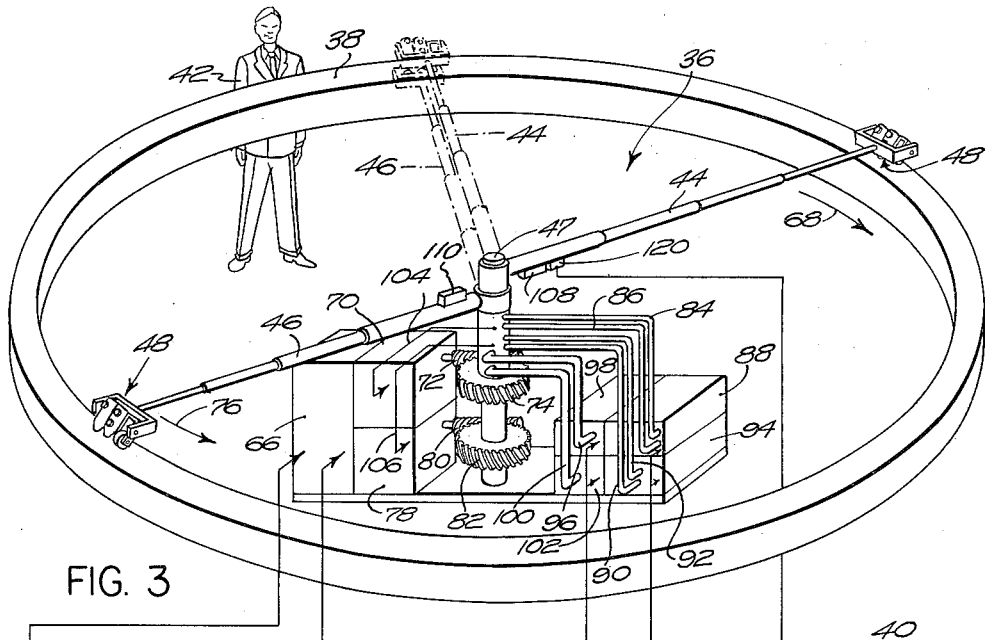
INVENTOR.
Donald A. Hay
BY
Morse & Altman United States Patent Office 3,036,824
Patented May 29, 1962

3,036,824
HEAT TREATING DEVICES
Donald A. Hay, Wellesley, Mass., assignor to Alloyd Research Corporation, Watertown, Mass., a corporation of Massachusetts
Filed Sept. 3, 1957, Ser. No. 681,582
3 Claims. (Cl. 266—4)

The present invention relates to metallurgy, particularly, to heat treatment by which a metal product may be heated and cooled in a sequence that determines its ultimate mechanical and physical characteristics. More particularly, the present invention relates to the sequential heating and cooling of sequential increments of a large annulus or the like by a pair of adjacent heating and cooling media moving together relative thereto. For example, the large annulus is a heavy-duty bearing race and the adjacent heating and cooling media are a gas-air flame and a water jet constrained for movement together about the race. Although such an adjacent pair of heating and cooling media are capable of producing a uniform heating and cooling sequence in increments of the annulus throughout most of its 360° arc, they do not serve conveniently to produce the same heating and cooling sequence at the adjacent initial and final increments to which the heating and cooling media are applied. The reason for this deficiency of a single pair of heating and cooling media is heat flow from the final increment last predeterminedly heated toward the initial increment previously predeterminedly cooled.

Primary objects of the present invention are: to provide processes and devices capable of producing predetermined heating and cooling in increments of a metallurgical product by virtue of two means for effecting heating and cooling in sequence, which means move in converging directions in order first to heat and then to cool final contiguous increments simultaneously; to provide a process of the foregoing type in which an annulus or the like is predeterminedly heated and cooled throughout its 360° arc; to provide a process of the foregoing type in which a steel annulus is predeterminedly heated to austenite and cooled to martensite throughout its 360° arc; and to provide an automatic device of the foregoing type for predeterminedly heating and cooling an annulus or the like of arbitrary diameter.

Other objects of the present invention will in part be obvious and will in part appear hereinafter.

The invention accordingly comprises the process involving the several steps and the relation and order of one or more of such steps with respect to each of the others, and the device possessing the construction, combination of elements and arrangement of parts, which are exemplified in the following detailed disclosure, and the scope of which will be indicated in the claims.

For a fuller understanding of the nature and objects of the present invention, reference should be had to the following detailed description taken in connection with the accompanying drawings wherein:

FIGURE 1 is a series of diagrams explaining the heat treating problem toward which the present invention is directed;

FIG. 2 is a series of diagrams explaining the process of the present invention;

FIG. 3 is a partly perspective and partly schematic illustration of a device embodying the present invention;

FIG. 4 is a detailed perspective view of a component of the device of FIG. 3; and FIG. 5 is a fragmentary view of two components of the device of FIG. 3 in initial operative relation.

Generally, the processes and devices illustrated herein are described in reference to the quenching of a heavy-duty, steel bearing race, increments of which are converted first to austenite by heating to relatively high temperatures, e.g. 1300–2000° F., and thereafter to martensite by rapid cooling to relatively low temperatures, e.g. 300–800° F., at a rate which substantially precludes the formation of pearlite. The heating, for example, may be effected by an organic gas-air flame or magnetic induction, and the cooling, for example, by a liquid such as water. It will be understood that these processes and devices are applicable as well to the quenching of products composed of metallic compositions other than steel.

FIGURE 1 illustrates the quenching of a steel bearing race of such large diameter as to preclude its being quenched in a bath. The arrows labeled "H" and "C" represent paired heating and cooling means that move together continuously in a counter-clockwise direction from a starting position designated by 12 in order to subject successive increments to a predetermined heating and cooling sequence. As shown in FIG. 1(a), a dotted increment 14 has been converted to austenite at elevated temperature and a hatched increment 16 as well as the initial increment 18 are shown, after having been converted at elevated temperatures to austenite, as having been converted at reduced temperatures to martensite.

FIGS. 1(b) and 1(c) illustrate the problem encountered when an attempt is made to apply a predetermined heating-cooling cycle to the terminal increment 20 immediately adjacent to starting position 12. As shown in FIG. 1(b), if an attempt is made to heat terminal increment 20 to the temperature necessary for conversion to austenite as a basis for subsequent conversion by cooling to martensite, heat flow into initial increment 18 occurs to an extent that undesirably tends to temper the martensite of initial increment 18. Also, as shown in FIG. 1(c), if an attempt is made to avoid heat flow into initial increment 18 as by cutting off the heating means before final increment 22 is completely heated, increment 22 is only incompletely converted into austenite so that subsequent cooling is incapable of producing the microstructure desired. Thus, it is apparent that a single paired heating and cooling means moved together relative to annulus 10 is incapable of producing a microstructure that is uniform throughout 360°.

FIG. 2 illustrates the quenching of the steel bearing race of FIG. 1 in accordance with the present invention. The arrows labeled "$H_1$" and "$C_1$" represent paired heating and cooling means that move together continuously in a counter-clockwise direction from a starting position designated by 24. The arrows labeled "$H_2$" and "$C_2$" represent paired heating and cooling means that move together continuously in a clockwise direction from starting position 24. As shown in FIG. 1(a), first, initial increments 26 and 28 are converted to austenite by heating means $H_1$ and $H_2$. Next, as shown in FIG. 1(b), as heating means $H_1$ and $H_2$ continue to move in opposite directions, initial increments 26 and 28 are converted to martensite by cooling means $C_1$ and $C_2$. Thereafter, as shown in FIG. 2(c), paired means $H_1$, $C_1$ and $H_2$, $C_2$ continue to move in opposite angular directions until adjacent final increments 30 and 32 become heated to temperatures at which the desired austenite microstructure is formed. At this point, heating means $H_1$ and $H_2$ are cut off. Finally, cooling means $C_1$ and $C_2$ continue to move in opposite directions until final increments 30 and 32 are cooled to temperatures at which the desired martensite microstructure is formed. Thus, the process of the present invention is capable of producing a uniform heating and cooling sequence in every increment of annulus 10 throughout 360°.

An automatic device for effecting the process of the present invention is shown in FIG. 3 as comprising an adjustable mechanism 36 for subjecting a bearing race 38 to a uniform heating and cooling cycle throughout its 360° arc and a control system 40 for sequencing the operation of mechanism 36 in accordance with the process of FIG. 2. The large size of race 38 is suggested by comparison with the figure of a man indicated at 42.

As shown, mechanism 36 comprises a pair of extensible-retractable telescoping arms 44 and 46 journaled for rotation on a central post 47. At the outer extremity of each arm is a heating, cooling and sensing unit 48. As shown in detail in FIG. 4, unit 48 includes a bracket 50, which is secured to the outer end of one of arms 44, 46, having a bight and a pair of outwardly extending arms. Pivotally mounted between the outwardly extending arms of bracket 50 are a water nozzle 52 controlled by a manually operated valve knob 54, a gas-air nozzle 56 controlled by manually operated gas valve knob 58 and air valve knob 60, and a thermocouple 62 mounted between the arms of a U-shaped support 64.

A motor 66 drives arm 44 in direction 68 through a variable ratio transmission 70, a worm 72, a gear 74 and a shaft (not shown) within post 47 and drives arm 46 in direction 76 through a variable ratio transmission 78, a worm 80, a gear 82 and a shaft (not shown) within post 47. The gas and air valves of nozzle 56 on arm 44 are supplied from gas and air pressure tanks (not shown) through flexible lines 84 and 86, respectively, extending within arm 44 and post 47, and through a control valve 88. Similarly, the gas and air valves of nozzle 56 on arm 46 are supplied from pressure tanks (not shown) through flexible lines 90 and 92, respectively, extending within arm 46 and post 47, and through a control valve 94. The valve of water nozzle 52 on arm 44 is supplied from a water supply (not shown) by a flexible line 96, extending through arm 44 and post 48, and through a control valve 98. The valve of water nozzle 52 on arm 46 is supplied from the water supply through a flexible line 100, extending through arm 46 and post 47, and through a control valve 102. Thermocouples 62 of arms 44 and 46 are connected by leads 104 and 106 extending within arms 44 and 46 and within post 47 to servomechanisms controlling variable ratio transmissions 70 and 78, respectively.

Mechanism 36 is controlled by system 40 as follows. Initially, arms 44 and 46 are aligned with the aid of a pair of lugs 108 and 110 carried by the innermost segments of the arms. While the arms are in this position, their lengths are adjusted to the diameter of race 38. It will be noted that bracket 50 of arm 44 is above and outward with respect to bracket 50 of arm 46 in order to permit overlapping of the arms, the nozzles and the thermocouples. Before the heat treatment is begun, nozzles 56 are pivoted outwardly, a gas and air control circuit 111 is switched on and the flames are adjusted manually by knobs 58 and 60 without affecting race 38. When the flames have been adjusted properly, nozzles 56 are pivoted downwardly toward race 38 and a start switch 112 is thrown. Start switch 112 actuates a time delay relay 114 which actuates motor 66 at the end of a predetermined interval, during which nozzles 56 heat their respective initial increments of race 38 to the elevated temperature at which the formation of austenite occurs. In consequence, arms 44 and 46 are driven in opposite directions 68, 76 at speeds controlled by signals from thermocouples 62 to variable ratio transmissions 70 and 78. Time delay relay 114, in turn, energizes a time delay relay 116 which, after the arms have moved through predetermined arcs, actuates a water control circuit 118. Thereafter, heating and cooling in response to the gas-air flame from nozzle 56 and the water jet from nozzle 52 continue as arms 44 and 46 swing in opposite directions at speeds governed by thermocouples 62. As arms 44 and 46 approach each other and nozzles 56 heat adjacent final increments of race 38, a switch 120 on arm 44 actuates a stop relay 122 which causes gas and air control 111 to close valves 88 and 94. Also, stop relay 122 energizes a time delay relay 124 which, at the end of a predetermined interval, stops motor 66 and energizes a time delay relay 126. After a predetermined interval, time delay relay 126 causes water control 118 to close valves 98 and 102.

Thus, the device of FIGS. 3 and 4 automatically and completely quenches race 38 to provide a uniform microstructure in an extremely simple but remarkably effective manner. Preferably, as shown in FIG. 5, in operation nozzles 52 and 56 and thermocouple 62 of arm 46 are directed obliquely toward the upper face of ring 38 at a given angle and their counterparts of arm 44 are directed obliquely toward the upper face of ring 38 at a complementary angle. It is to be understood that the gas-air nozzles and the thermocouples may be constrained for arcuate motion by means other than centrally pivoted arms, e.g. by outer arcuate guides or rails.

Since certain changes may be made in the above processes and devices without departing from the scope of the invention herein involved, it is intended that all matter contained in the above description and shown in the accompanying drawings shall be interpreted in an illustrative and not in a limiting sense.

I claim:

1. An automatic device for subjecting a bearing race, of large diameter relative to the size of a man, to a uniform heating and cooling cycle throughout its 360° arc, said device comprising a pair of extensible-retractable telescoping arms journaled for rotation at their inner extremities on a central post, each of said arms carrying at its outer extremity a heating, cooling and sensing unit, said unit including a bracket having a bight, which is secured to said outer extremity, and a pair of outwardly extending arms, a fluid nozzle, a combustible gas nozzle and a thermocouple mounted between said arms of said bracket, a motor for driving one of said telescoping arms in one arcuate direction in a first plane the other of said telescoping arms in the other arcuate direction in a second plane, said first plane and said second plane being at different heights above said bearing, said fluid nozzle, said combustible gas nozzle and said thermocouple of one of said telescoping arms being oriented at a given angle with respect to the plane, said fluid nozzle, said combustible gas nozzle and said thermocouple of the other of said telescoping arms being oriented at an angle other than said first-mentioned given angle with respect to said planes, a start switch for energizing said device, a first time delay relay responsive to said start switch for actuating said motor at the end of a predetermined interval during which the nozzles are adapted to heat their associated respective initial increments, a fluid control circuit for opening and closing the fluid nozzles, a second time delay relay responsive to said first time delay relay for opening said fluid nozzles, a second switch for closing the combustible gas nozzles when said telescoping arms are predeterminedly adjacent to each other, a third time delay relay responsive to said second switch for halting movement of said telescoping arms, and a fourth time delay relay responsive to said third time delay relay for closing the fluid nozzles.

2. The device of claim 1 wherein a pair of variable ratio transmissions control the speed of said telescoping arms in response to signals from said thermocouples.

3. An automatic device for subjecting a bearing race, of large diameter relative to the size of a man, to uniform heating and cooling cycle throughout its 360° arc, said device comprising a first extensible-retractable means and a second extensible-retractable means constrained for movement about a vertical axis substantially in a first plane and substantially in a second plane, respectively, said first extensible-retractable means carrying a first heating unit, a first cooling unit and a first sensing unit, said second extensible-retractable means carrying a second heating unit, a second cooling unit and a second sensing unit, first drive means for driving said first extensible-retractable means in one direction at a speed governed by said first sensing unit, second drive means for driving said second extensible-retractable means in the other direction at a speed governed by said second sensing unit, said first heating unit and said first cooling unit being oriented to direct a first heating medium and first cooling medium at a first given angle with respect to said vertical axis, said second heating unit and said second cooling unit being oriented to direct a second heating medium and a second cooling medium at a second given angle with respect to said vertical, said first extensible-retractable means and said second extensible-retractable means being disposed along a first radius of said bearing at the initiation of said cycle and being disposed along a second radius of said bearing at the termination of said cycle, said first given angle and said second given angle being equal and being subtended at opposite sides of a vertical at said initiation and termination of said cycle, both of said first extensible-retractable means and said second extensible-retractable means being movable through arcs greater than 180° in extent.

References Cited in the file of this patent
UNITED STATES PATENTS

| | | |
|---|---|---|
| 2,282,670 | Mitchell | May 12, 1942 |
| 2,410,134 | Stevenson et al. | Oct. 29, 1946 |
| 2,617,643 | Clarcq | Nov. 11, 1952 |